United States Patent [19]

Ogura et al.

[11] 3,925,247

[45] Dec. 9, 1975

[54] METHOD FOR PREPARING CATALYST FOR THE PRODUCTION OF VINYL FLUORIDE

[75] Inventors: Eiji Ogura; Nobuki Nomura, both of Onoda; Kiyotada Emoto, Ube, all of Japan

[73] Assignee: Onoda Cement Co., Ltd., Yamaguchi, Japan

[22] Filed: Dec. 28, 1973

[21] Appl. No.: 429,691

[30] Foreign Application Priority Data
Dec. 28, 1972 Japan............................ 47-130229

[52] U.S. Cl............. 252/429 R; 252/434; 252/438; 252/440; 252/441; 252/447; 260/653.4
[51] Int. Cl.$^2$..................... B01J 31/04; B01J 27/12; B01J 27/24; B01J 27/02
[58] Field of Search.......... 252/434, 447, 438, 428, 252/440, 441, 429 R

[56] References Cited
UNITED STATES PATENTS

| | | | |
|---|---|---|---|
| 1,355,299 | 10/1920 | Bender.......................... | 252/447 X |
| 2,426,792 | 9/1947 | Salisbury........................... | 252/438 |
| 2,437,308 | 3/1948 | Salisbury........................... | 252/438 X |
| 2,455,881 | 12/1948 | Salisbury........................... | 252/447 X |
| 2,692,295 | 10/1954 | Peters............................ | 252/447 X |
| 3,342,881 | 9/1967 | Sasakura et al.................. | 252/447 X |
| 3,413,361 | 11/1968 | Foulletier....................... | 252/438 X |
| 3,584,061 | 6/1971 | Olstowski et al. .............. | 252/434 X |

*Primary Examiner*—Patrick P. Garvin
*Attorney, Agent, or Firm*—Oblon, Fisher, Spivak, McClelland & Maier

[57] ABSTRACT

This invention relates to an improved method of producing a catalyst for the production of vinyl fluoride. This invention comprises incorporating activated carbon, which has been activated with nitric acid and subsequently washed so as to remove the acid with a mercuric compound or a cadmium compound, or a mixture of a mercuric compound and a compound consisting of chloride, fluoride, sulphate, nitrate, oxide or hydroxide of lead, tin, cadmium or zinc, and pretreating the resultant material at a temperature of 30° to 300°C with hydrogen fluoride gas.

10 Claims, No Drawings

METHOD FOR PREPARING CATALYST FOR THE PRODUCTION OF VINYL FLUORIDE

BACKGROUND OF THE INVENTION

1. Field of the Invention

This invention relates to an improved method for preparing catalyst used in the production of vinyl fluoride by the reaction of acetylene and hydrogen fluoride in the gaseous phase.

2. Description of the Prior Art

Heretofore, there have been proposed many catalysts for use in producing vinyl fluoride by reacting acetylene with hydrogen fluoride in the gaseous phase. For example, catalysts comprising activated carbon carriers which are impregnated with mercuric compounds such as mercuric chloride, mercuric nitrate, or mercuric oxide have been proposed. These catalysts, however, have been found to be unsatisfactory in that they exhibit such defects as the rapid loss of catalytic activity and the production of large amounts of tar by which the granular catalyst is cemented together and loses its efficiency. For example, Japanese patent publication No. 16522 published in 1965, discloses that the activity of mercury-charcoal type catalysts deteriorates to 50% of its original activity within 12 to 16 hours after the beginning of the reaction between acetylene and hydrogen fluoride to produce vinyl flouride.

Two of the present inventors eliminated these defects from these catalysts and found that certain catalysts, which comprise at least one mercuric compound and at least one inorganic compound of lead, tin, cadmium or zinc have high catalytic activity at a low temperature and they can maintain their activities for prolonged periods of time with less formation of by-product such as tar. This is disclosed in Japanese Patent Publication No. 38311 published in 1972 now, U.S. Pat. No. 3,555,102.

However, a need exists to obtain a catalyst for use in the production of vinyl fluoride by the gaseous reaction of acetylene and hydrogen fluoride which enables the vinyl fluoride to be obtained in high yield and which also has a longer life than the known catalysts.

SUMMARY OF THE INVENTION

Accordingly, one object of this invention is to provide a process for producing a catalyst which has both a long life and high catalytic activity.

Another object of this invention is a catalyst which has high catalytic activity and longevity.

Still another object of this invention is to provide a method for producing vinyl fluoride in high yield.

Yet another object of this invention is to provide a process for treating an activated carbon carrier with nitric acid and impregnating the thus treated carrier with a catalyst.

Briefly, these and other objects of the invention as hereinafter will become apparent are achieved by treating activated carbon with nitric acid and impregnating the treated carrier with a catalytic agent for the gaseous reaction of acetylene and hydrogen fluoride to obtain vinyl fluoride.

DESCRIPTION OF THE PREFERRED EMBODIMENTS

As catalysts of the present invention, the catalysts disclosed in the aforementioned Japanese Patent Publication No. 38311 as well as the well known catalytic reagents for the acetylene hydrogen fluoride reaction may be used. These catalysts may be carried on activated carbon previously treated with nitric acid by dipping in nitric acid, or on an activated carbon carrier impregnated with the above catalytic reagent by dipping the activated carbon in the nitric acid solution containing the above catalytic reagents. The resulting catalysts, when used in the gaseous reaction produce vinyl fluoride in high yield and have a very long catalytic life.

The process for obtaining the improved catalyst of this invention may be as follows:

A. Activated carbon is treated with nitric acid and then impregnated with the catalytic reagent for the production of vinyl fluoride; or B. Activated carbon is treated with nitric acid containing a catalytic reagent for the production of vinyl fluoride and evaporated to dryness to impregnate the activated carbon with the catalytic reagent.

The following embodiments of the present invention is preferred and are dependent on the concentration of the nitric acid used.

A.-1 0.5-6 N nitric acid:

Activated carbon is dipped in the nitric acid, heated and filtered. This process is repeated from 2-3 times. The activated carbon carrier thus treated is impregnated with the catalytic reagent for the production of vinyl fluoride.

A.-2 6-10 N nitric acid:

Activated carbon is treated with nitric acid as in (A)-1 although the number of times the process is repeated may be lessened. Alternatively, the activated carbon may be dipped in the nitric acid, filtered and the thus treated activated carbon is impregnated with the catalytic reagent for the production of vinyl fluoride.

A.-3 Nitric acid of over 10 N:

Activated carbon is dipped in the nitric acid, filtered and impregnated with the catalytic reagent for the production of vinyl fluoride, and then evaporated to dryness.

B. Activated carbon is dipped in nitric acid of 6 N or higher containing a catalytic reagent for the production of vinyl fluoride and evaporated to dryness.

It is not necessary to use only nitric acid and mixtures of nitric acid with other acids such as hydrochloric acid may be used instead of nitric acid alone with equally good results.

There is no noticeable difference in catalytic activity between the catalyst comprising activated carbon treated with nitric acid and then washed to eliminate the acid compare to that comprising activated carbon treated with the acid but not washed to eliminate the acid.

The catalyst which is to be added to the activated carbon comprises at least one compound selected from already known mercuric compounds such as mercuric chloride, mercuric fluoride, mercuric nitrate, mercuric acetate, mercuric oxide or the like and cadmium compounds such as cadmium chloride, cadmium fluoride, cadmium nitrate, cadmium sulphate, cadmium hydroxide, cadmium oxide or the like and mixtures containing a mercuric compound such as mercuric chloride, mercuric fluoride, mercuric nitrate, mercuric acetate, mercuric oxide or the like and at least one compound selected from the group consisting of $PbCl_2$, $PbF_2$, $Pb(OH)_2$, $PbSO_4$, $Pb(NO_3)_2$, $Pb_3O_4$, $PbO$, $SnCl_4$, $Sn(SO_4)_2$, $SnF_4$, $SnO_2$, $SnOCl$, $CdCl_2$, $CdF_2$, $Cd(NO_3)_2$, $Cd(OH)_2$, $CdSO_4$, $CdO$, $ZnCl_2$, $ZnF_2$, $Zn(OH)_2$, $Zn(NO_3)_2$, $ZnSO_4$, and the like as disclosed in Japanese patent publication No. 38311 published in 1972.

The activated carbon may be impregnated with one of above catalytic reagents which may be dissolved or suspended in water and then evaporated to dryness. The catalyst of the present invention may be prepared by impregnating the activated carbon with various amounts of the mercuric compound, however, it is preferably to use an amount of from 3–30% by weight of said carrier calculated at HgO. The amount of cadmium compound impregnated into the activated carbon may also vary, however, an amount of from 3–40% by weight of said carrier calculated as CdO is preferred.

The amount of the mercuric compound and the inorganic compound of Pb, Sn, Cd or Zn impregnated into the carbon may vary but is preferably in an amount of from 3–30% by weight of said carrier calculated at HgO and in an amount of from 25–200% calculated as oxide of the metal by weight of the mercuric compound calculated as HgO. The thus impregnated activated carbon is dried to produce the catalyst.

The thus obtained catalysts may be preferably pre-treated with hydrogen fluoride gas diluted with an inert gas such as nitrogen or the like in an amount of from 10–40 times that of the hydrogen fluoride calculated so as to change the catalysts to their fluorides prior to their use in the production of vinyl fluoride.

The activated carbon impregnated with the cadmium compound may be preferably pre-treated with hydrogen fluoride at a temperature of from about 30°–400°C and the activated carbon impregnated with the mercuric compound or a mixture of the mercuric compound and the inorganic compound of lead, tin, cadmium and zinc may be preferably pre-treated with hydrogen fluoride at a temperature of from about 30°–300°C. If such a pre-treatment is not applied to the catalyst before it is used, the catalyst reacts with or adsorbs the hydrogen fluoride contained in the starting gaseous reaction mixture immediately after the reaction occurs, and causes a deficiency in hydrogen fluoride or a surplus of acetylene in the starting gaseous reaction mixture until the reaction reaches the equilibrium state, and therefore, the gaseous phase contains an excess of unreacted acetylene which is carbonized or converted into a tarry substance which accelerates the deterioration of the catalyst. In addition, when the catalyst is prepared by using a chloride of Hg, Pb, Sn, Cd or Zn and is not pre-treated as in the above mentioned manner, it is impossible to avoid the undesirable phenomenon of the temporary formation of vinyl chloride in the initial stage of the reaction.

It is preferably to prepare vinyl fluoride from a gaseous mixture of acetylene and hydrogen fluoride by using the catalyst of the present invention at a temperature of from 250°–400°C in the case of the cadmium compound and at a temperature of from 25°–250°C in the case of a mercuric compound as well as in the case of a mixture of the mercuric compound and the inorganic compound of lead, tin, cadmium or zinc to maintain their catalytic activity for a prolonged period of time.

When the catalyst are employed at a temperature of below 25°C, hydrogen fluoride tends to condense onto them and acetylene gas tends to carbonize or be coverted into a tarry substance by contacting with the condensed hydrogen fluoride; and hence the catalytic activity is reduced and the bed of catalyst is clogged with a cake of tarry substance. On the contrary, when the catalysts are used at a temperature above 400°C in case of a cadmium compound or at a temperature of above 250°C in case of a mercuric compound, the carbonization of acetylene or the conversion of it to a tarry substance is highly accelerated.

The molar ratio of hydrogen fluoride to acetylene ($HF/C_2H_2$) in the present invention may be from 1–5, and preferably 1–2. It is undesirable to use a molar ratio below 1 because the unreacted acetylene remains in the reaction zone. It is also undesirable to use a molar ratio of above 5, because it then becomes necessary to recover a large amount of hydrogen fluoride. It is preferably to feed the mixture of hydrogen fluoride and acetylene to the catalyst at a space velocity of from 20 to 1,000 liters per liter of catalyst per hour, and preferably at a space velocity of from 50 to 600 liters per liter of catalyst per hour. When the operating conditions are maintained in the above range, the catalyst life is remarkably prolonged without decreasing the catalytic activity as shown in the following examples. When a space velocity of above 1,000 liters/liter of catalyst/hour is used, the conversion rate of acetylene is remarkably reduced and simultaneously the life of the catalyst is shortened. Also, when a space velocity is below 50 liters/liter of catalyst/hour is used, the economical merit of the present invention cannot be achieved.

The present invention is illustrated by the following examples using granular activated carbon, but the present invention is not limited to the catalyst using granular activated carbon as a carrier. Activated carbon powder can be also successfully used instead of granular activated carbon.

The rate of conversion of acetylene and yields of vinyl fluoride is calculated as follows: conversion rate of acetylene (%)=

$$\frac{CH_2CHF\ produced(mol) + CH_3CHF_2\ produced(mol) + CH_2CHCl\ produced(mol)}{acetylene\ supplied(mol)} \times 100$$

$$Yield\ of\ CH_2CHF = \frac{CH_2CHF\ produced(mol)}{acetylene\ converted(mol)} \times 100\ (\%)$$

Having generally described the invention, a more complete understanding can be obtained by reference to certain specific examples, which are included for purposes of illustration only and are not intended to be limiting unless otherwise specified.

EXAMPLE 1

Granular activated carbon was charged in a beaker and 16 N $HNO_3$ was added to cover the surface of the granular activated carbon and then the carbon was immediately filtered.

The filtered activated carbon was then washed thoroughly with distillated water to eliminate the $HNO_3$ adhered to the activated carbon and allowed to stand in an air over maintained at 150°C for 16 hours to dry. 100 weight parts (hereinafter indicated as parts) of the thus dried activated carbon was impregnated with an aqueous solution of mercuric chloride to carry 10 parts of mercuric chloride on the carbon and then dried to prepare the catalyst.

111g of the thus prepared catalyst were charged into a reactor made of ¾ inch gas pipe having an inner diameter of 21.6mm to form a catalyst bed of 60 cm in height. The reactor was heated to 50°C, hydrogen fluoride gas diluted with nitrogen (the concentration of hydrogen fluoride was 75 mol %) was introduced at the feed rate of 41 liters/hour for 1 hour and then a gaseous reactant mixture having a molar ratio of HF/$C_2H_2$ of 2 was introduced from the top of the reactor at the rate of 150 liters/liter catalyst/hour (calculated as in NTP) to cause reaction. The resultant gaseous mixture was washed with an alkaline solution to remove unreacted hydrogen fluoride and then the gaseous mixture was analyzed with a gas chromatograph.

The results of analysis of the gaseous mixtures at the end of 4 and 64 hour periods of reaction were as follows:

|  | After 4 hours | After 64 hours |
|---|---|---|
| Vinyl Fluoride | 95.5% (mol) | 88.2% (mol) |
| 1,1-Difluoroethane | 4.0% (mol) | 11.5% (mol) |
| Acetylene | 0.3% (mol) | 0.3% (mol) |
| Vinyl Chloride | 0.2% (mol) | Trace |
| Conversion Rate of Acetylene | 98.2% | 96.8% |
| Yield of Vinyl Fluoride | 95.8% | 88.5% |

Comparative Example 1

One hundred parts of a granular activated carbon not treated with nitric acid was impregnated with the aqueous solution of mercuric chloride as in Example 1 to carry 10 parts of mercuric chloride on the carbon and then dried to prepare the catalyst. The catalyst was charged in the same reactor as disclosed in Example 1 and the reaction was repeated as disclosed in Example 1. The composition of the resultant gaseous mixtures at the end of the 4 and 64 hour periods of reaction were as follows:

|  | After 4 hours | After 64 hours |
|---|---|---|
| Vinyl Fluoride | 92.6% (mol) | 13.4% (mol) |
| 1,1-Difluoroethane | 5.9% (mol) | 6.2% (mol) |
| Acetylene | 0.5% (mol) | 80.4% (mol) |
| Vinyl Chloride | 1.0% (mol) | Trace |
| Conversion Rate of Acetylene | 97.4% | 17.8% |
| Yield of Vinyl Fluoride | 93.1% | 68.4% |

EXAMPLE 2

Granular activated carbon was charged in a beaker and a 1 : 1 nitric acid (made by diluting 12 N conc. $HNO_3$ with an equal amount of water) was added to cover the surface of the granular activated carbon and heated for 40 minutes on a water bath. Thereafter, the activated carbon was filtered, washed with water and then dried by allowing it to stand in an air over controlled at 150°C. 100 parts of the thus dried activated carbon were impregnated with an aqueous solution of cadmium sulphate to impart 10 parts of cadmium sulphate to the carbon and then dried to prepare the catalyst. 105g of the catalyst were charged into a reactor made of ¾ inch gas pipe having an inner diameter of 21.6 mm to form a catalyst bed of 60 cm in height.

The reactor was heated to 300°C, hydrogen fluoride gas diluted with nitrogen was introduced from the top of the reactor as disclosed in Example 1 for 1 hour, and then a reactant gaseous mixture of acetylene and hydrogen fluoride having a molar ratio of HF/$C_2H_2$ of 2 was introduced from the top of the reactor at the rate of 150 liters/liter of catalyst/hour (calculated as in NTP) and the resultant gaseous mixtures having the following compositions were obtained at the end of the 5 and 53 hour periods of reaction.

|  | After 5 hours | After 53 hours |
|---|---|---|
| Vinyl Fluoride | 83.5% (mol) | 78.0% (mol) |
| 1,1-Difluoroethane | 12.1% (mol) | 11.4% (mol) |
| Acetylene | 4.4% (mol) | 10.6% (mol) |
| Conversion Rate of Acetylene | 93.0% | 86.0% |
| Yield of Vinyl Fluoride | 87.3% | 87.3% |

Comparative Example 2

One hundred parts of a granular activated carbon as in Example 2 except that it wasn't treated with nitric acid was impregnated with the aqueous solution of cadmium sulphate to impart 10 parts of cadmium sulphate to the carbon and then dried to prepare the catalyst as in Example 2. The catalyst was then charged into the reactor as disclosed in Example 2 and the reaction was repeated also as disclosed in Example 2. The composition of resultant gaseous mixtures at the end of the 5 and 53 hour periods of the reaction were as follows:

|  | After 5 hours | After 53 hours |
|---|---|---|
| Vinyl Fluoride | 75.9% (mol) | 32.7% (mol) |
| 1,1-Difluoroethane | 15.3% (mol) | 15.5% (mol) |
| Acetylene | 8.8% (mol) | 51.9% (mol) |
| Conversion Rate of Acetylene | 88.4% | 44.4% |
| Yield of Vinyl Fluoride | 83.2% | 67.8% |

EXAMPLE 3

Granular activated carbon was charged in a beaker and 5 N nitric acid was added to cover the surface of granular activated carbon, and then heated on a water bath and filtered. The above treatments with nitric acid were repeated three times. Thereafter, distilled water was added to just cover the activated carbon, heated on a water bath and then the activated carbon was filtered. The washing process was also repeated three times. The activated carbon thus pre-treated was dried in an air over controlled at 120°C for 10 hours. 100 parts of the thus pre-treated and dried activated carbon was impregnated with an aqueous solution of mercuric nitrate and cadmium nitrate to impart 12 parts of mercuric nitrate and 11.3 parts of cadmium nitrate to the carbon and then dried to prepare the catalyst.

100 g of this catalyst were charged into a reactor made of 3/4 inch gas pipe having an inner diameter of 21.6 mm to form a catalyst bed of 60 cm in height. The reactor was heated to 50°C, hydrogen fluoride diluted with nitrogen (the concentration of hydrogen fluoride gas was 75 mol %) was introduced at the rate of 41 liters/hour for 2 hours and a gaseous reactant mixture having a molar ratio of HF/$C_2H_2$ of 1.67 was introduced from the top of the reactor at the rate of 152 liters/liter of catalyst/hour (calculated as in NTP). The resultant gaseous mixtures having the following compositions were obtained at the end of 5 and 127 hour periods of reaction.

|  | After 5 hours | After 127 hours |
|---|---|---|
| Vinyl Fluoride | 99.2% (mol) | 98.8% (mol) |
| 1,1-Difluoroethane | 0.8% (mol) | 1.2% (mol) |
| Acetylene | Trace | Trace |
| Conversion Rate of Acetylene | 99.0% | 98.1% |
| Yield of Vinyl Fluoride | 99.2% | 98.9% |

Comparative Example 3

One hundred parts of the granular activated carbon used in Example 3 except that it was not treated with nitric acid was impregnated with the aqueous mixed solution of mercuric nitrate and cadmium nitrate to impart 12 parts of mercuric nitrate and 11.3 parts of cadmium nitrate to the carbon and then dried to prepare the catalyst as in Example 3. The catalyst was then charged into the reactor as disclosed in Example 3 and the reaction repeated also as disclosed in Example 3. The composition of the resultant gaseous mixtures at the end of the 5 and 127 hour periods of reaction are as follows:

|  | After 5 hours | After 127 hours |
| --- | --- | --- |
| Vinyl Fluoride | 99.0% (mol) | 85.1% (mol) |
| 1,1-Difluoroethane | 0.9% (mol) | 0.9% (mol) |
| Acetylene | 0.1% (mol) | 14.0% (mol) |
| Conversion Rate of Acetylene | 98.4% | 83.1% |
| Yield of Vinyl Fluoride | 99.1% | 99.0% |

EXAMPLE 4

Granular activated carbon was charged into a beaker and 9.2 N nitric acid was added to cover the surface of the granular activated carbon and then the beaker was heated for 40 minutes on a water bath. Thereafter, the activated carbon was filtered, washed with water to eliminate thoroughly any excess nitric acid and dried by allowing it to stand in an air oven for 16 hours controlled at a temperature of 150°C.

One hundred parts of the thus dried activated carbon were impregnated with an aqueous solution of mercuric chloride and zinc chloride to impart 8.5 parts of mercuric chloride and 6.5 parts of zinc chloride to the carbon and dried to obtain the catalyst. This catalyst was charged into a reactor as disclosed in Example 1 to form a catalyst bed of 30 cm in height. The catalyst was then pre-treated with hydrogen fluoride for 2 hours also as disclosed in Example 1. The reactor was heated to 50°C, a gaseous mixture reactant having a molar ratio of $HF/C_2H_2$ of 1.5 was introduced from the top of the reactor at the rate of 196 liters/liter of catalyst/hour (calculated as in NTP).

The resultant gaseous mixtures having the following compositions were obtained at the end of 4 and 48 hours periods of reaction.

|  | After 4 hours | After 48 hours |
| --- | --- | --- |
| Vinyl Fluoride | 70.1% (mol) | 68.9% (mol) |
| 1,1-Difluroethane | 5.7% (mol) | 8.5% (mol) |
| Acetylene | 23.8% (mol) | 22.6% (mol) |
| Vinyl Chloride | 0.4% (mol) | Trace |
| Conversion Rate of Acetylene | 76.2% | 74.5% |
| Yield of Vinyl Fluoride | 92.0% | 89.0% |

Comparative Example 4

One hundred parts of the granular activated carbon used in Example 4 but which was not treated with nitric acid was impregnated with the aqueous solution of mercuric chloride and zinc chloride to impart 8.5 parts of mercuric chloride and 6.5 parts of zinc chloride to the carbon and then dried to prepare the catalyst. The catalyst was charged into the reactor as disclosed in Example 4 and then the reaction was repeated as disclosed in Example 4. The compositions of the resultant gaseous mixtures at the end of 4 and 48 hour periods of reaction were as follows:

|  | After 4 hours | After 48 hours |
| --- | --- | --- |
| Vinyl Fluoride | 70.2% (mol) | 54.7% (mol) |
| 1,1-Difluoroethane | 1.3% (mol) | 2.6% (mol) |
| Acetylene | 27.8% (mol) | 42.7% (mol) |
| Vinyl Chloride | 0.7% (mol) | Trace |
| Conversion Rate of Acetylene | 72.2% | 52.9% |
| Yield of Vinyl Fluoride | 97.2% | 95.5% |

EXAMPLE 5

Granular activated carbon was charged into a beaker and a mixed acid of conc. nitric acid and conc. hydrochloric acid in a ratio of 1 : 1 was added to cover the surface of the granular activated carbon and heated for 40 minutes on a water bath. Thereafter, the activated carbon was filtered, washed with water and dried by allowing it to stand for 16 hours in an air oven controlled at a temperature of 150°C. 100 parts of the thus dried activated carbon were impregnated with the aqueous mixed solution of mercuric nitrate and cadmium nitrate to impart 12 parts of mercuric nitrate and 11.3 parts of cadmium nitrate to the carbon to prepare the catalyst.

This catalyst was charged into a reactor as disclosed in Example 1 to form a catalyst bed of 60 cm in height (107.5 g of catalyst). The reactor was heated to 50°C, hydrogen fluoride gas diluted with nitrogen was introduced for 2 hours as disclosed in Example 1, then a gaseous reactant mixture having a molar ratio of $HF/C_2H_2$ of 1.2 was introduced from the top of the reactor at the rate of 183 liters/liter of catalyst/hour (calculated as in NTP).

The resultant gaseous mixtures having the following compositions were obtained at the end of the 4 and 136 hour periods of reaction.

|  | After 4 hours | After 136 hours |
| --- | --- | --- |
| Vinyl Fluoride | 95.2% (mol) | 93.3% (mol) |
| 1,1-Difluoroethane | 0.8% (mol) | 1.7% (mol) |
| Acetylene | 4.0% (mol) | 5.0% (mol) |
| Conversion Rate of Acetylene | 95.3% | 94.6% |
| Yield of Vinyl Fluoride | 99.2% | 98.2% |

Comparative Example 5

One hundred parts of the granular activated carbon used in Example 5 but which were not treated with nitric acid were impregnated with the aqueous solution of mercuric nitrate and cadmium nitrate to impart 12 parts of mercuric nitrate and 11.3 parts of cadmium nitrate to the carbon and then dried to prepare the catalyst.

The catalyst was charged into the reactor as disclosed in Example 5 and the reaction was repeated as disclosed in Example 5. The composition of the resultant gaseous mixtures at the end of the 4 and 136 hour periods of reaction were as follows:

|  | After 4 hours | After 136 hours |
| --- | --- | --- |
| Vinyl Fluoride | 94.9% (mol) | 81.2% (mol) |
| 1,1-Difluoroethane | 1.2% (mol) | 1.5% (mol) |
| Acetylene | 3.9% (mol) | 17.3% (mol) |
| Conversion Rate of Acetylene | 92.0% | 77.8% |
| Yield of Vinyl Fluoride | 98.8% | 98.2% |

EXAMPLE 6

One hundred parts of granular activated carbon were charged in a beaker and 1 : 1 nitric acid (made by diluting 12 N conc. $HNO_3$ with equal amount of water) was added to cover the surface of the granular activated carbon, then 12 parts of mercuric nitrate and 11 parts of cadmium nitrate were added and the beaker containing carbon, acid and salts was evaporated to dryness on a water bath. Thereafter, the impregnated activated carbon was dried by allowing it to stand in an air oven for 16 hours controlled at a temperature of 150°C to prepare the catalyst.

This catalyst was charged into the same reactor used in Example 1 to form a catalyst bed of 60 cm in height (101 g of catalyst). The reactor was heated to 50°C, hydrogen fluoride gas diluted with nitrogen was introduced for 2 hours as disclosed in Example 1 and then a gaseous reactant mixture having a molar ratio of $HF/C_2H_2$ of 1.9 was introduced from the top of the reactor at the rate of 212 liters/liter catalyst/hour (calculated as in NTP).

The resultant gaseous mixtures having the following compositions were obtained at the end of the 4 and 48 hour periods of reaction.

|  | After 4 hours | After 48 hours |
| --- | --- | --- |
| Vinyl Fluoride | 99.3% (mol) | 98.9% (mol) |
| 1,1-Difluoroethane | 0.7% (mol) | 1.0% (mol) |
| Acetylene | Trace | 0.1% (mol) |
| Conversion Rate of Acetylene | 98.8% | 97.8% |
| Yield of Vinyl Fluoride | 99.3% | 99.0% |

Comparative Example 6

One hundred parts of the granular activated carbon used in Example 6 but which were not treated with nitric acid, were impregnated with mercuric nitrate and cadmium nitrate to import 12 parts of mercuric nitrate and 11 parts of cadmium nitrate as in Example 6 and then the impregnated active carbon was dried to prepare the catalyst.

The thus prepared catalyst was then charged into the reactor as disclosed in Example 6 and the reaction was repeated as disclosed in Example 6. The compositions of the resultant gaseous mixtures at the end of the 4 and 48 hour periods of reaction were as follows:

|  | After 4 hours | After 48 hours |
| --- | --- | --- |
| Vinyl Fluoride | 98.8% (mol) | 79.0% (mol) |
| 1,1-Difluorethane | 1.2% (mol) | 1.8% (mol) |
| Acetylene | Trace | 19.2% (mol) |
| Conversion Rate of Acetylene | 99.0% | 77.1% |
| Yield of Vinyl Fluoride | 98.8% | 97.8% |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of producing a catalyst for the production of vinyl fluoride by the gaseous reaction of acetylene and hydrogen fluoride, consisting essentially of incorporating activated carbon, which has been activated with nitric acid and washed with water so as to eliminate said nitric acid, with mercuric chloride, mercuric fluoride, mercuric nitrate, mercuric acetate, mercuric oxide, cadmium chloride, cadmium fluoride, cadmium nitrate, cadmium sulphate, cadmium oxide, cadmium hydroxide, or a mixture of mercuric chloride, mercuric fluoride, mercuric nitrate, mercuric acetate or mercuric oxide and a compound consisting of chloride, fluoride, sulphate, nitrate, oxide or hydroxide of lead, tin, cadmium or zinc, and pre-treating the resultant activated carbon with hydrogen fluoride gas.

2. The method according to claim 1, wherein the activated carbon is impregnated with the mercuric compound in an amount of 3 to 30% by weight of said carrier calculated as HgO by weight.

3. The method according to claim 1, wherein the activated carbon is impregnated with the cadmium compound in an amount of 3 to 40% by weight of said carrier calculated as CdO by weight.

4. The method according to claim 1, wherein the activated carbon is impregnated with the inorganic compound of Pb, Sn, Cd, or Zn in an amount of 25 to 200% calculated as metal oxide by weight of the mercuric compound calculated as HgO by weight.

5. The method according to claim 1, wherein the resultant activated carbon is pre-treated with hydrogen fluoride diluted with an inert gas in an amount of 10 to 40 times that of the hydrogen fluoride calculated so as to change the catalytic reagent to the fluoride.

6. The method of claim 1, wherein the resultant activated carbon is pre-treated with hydrogen fluoride at a temperature of 30° – 300°C.

7. The method of claim 1, wherein the activated carbon is activated by pre-treatment with nitric acid washed with water, and then the activated carbon is impregnated with the catalytic reagent and is evaporated to dryness.

8. The method of claim 7, wherein the activated carbon is activated by soaking in 0.5–10 N nitric acid, heating, and then filtered off.

9. The method of claim 8, wherein the activated carbon is soaked in 0.5–6 N nitric acid.

10. The method of claim 7, wherein the activated carbon is soaked in nitric acid having a concentration greater than 6 N and is filtered.

* * * * *